United States Patent
Sabahi et al.

(10) Patent No.: US 11,458,456 B2
(45) Date of Patent: Oct. 4, 2022

(54) FCC CATALYST PREPARED BY A PROCESS INVOLVING MORE THAN ONE SILICA MATERIAL

(71) Applicant: Albemarle Corporation, Charlotte, NC (US)

(72) Inventors: Amir Sabahi, Missouri City, TX (US); Andrew Loebl, Charlotte, NC (US); Sandra Gavalda, Manvel, TX (US); Julie Francis, Webster, TX (US); Eswaramoorthi Iyyamperumal, Houston, TX (US); Min Li, Houston, TX (US); Andrea Marcinkova, Houston, TX (US)

(73) Assignee: Albemarle Corporation, Charlotte, NC (US)

( * ) Notice: Subject to any disclaimer, the term of this patent is extended or adjusted under 35 U.S.C. 154(b) by 0 days.

(21) Appl. No.: 16/960,927

(22) PCT Filed: Jan. 11, 2019

(86) PCT No.: PCT/US2019/013236
§ 371 (c)(1),
(2) Date: Jul. 9, 2020

(87) PCT Pub. No.: WO2019/140223
PCT Pub. Date: Jul. 18, 2019

(65) Prior Publication Data
US 2020/0330960 A1    Oct. 22, 2020

Related U.S. Application Data

(60) Provisional application No. 62/616,807, filed on Jan. 12, 2018.

(51) Int. Cl.
| | |
|---|---|
| *B01J 21/12* | (2006.01) |
| *B01J 21/16* | (2006.01) |
| *B01J 29/04* | (2006.01) |
| *B01J 37/00* | (2006.01) |
| *B01J 37/04* | (2006.01) |
| *C10G 11/05* | (2006.01) |
| *C10G 11/18* | (2006.01) |

(52) U.S. Cl.
CPC ............. *B01J 21/12* (2013.01); *B01J 21/16* (2013.01); *B01J 29/04* (2013.01); *B01J 37/0018* (2013.01); *B01J 37/04* (2013.01); *C10G 11/05* (2013.01); *C10G 11/18* (2013.01); *C10G 2300/70* (2013.01)

(58) Field of Classification Search
CPC ... B01J 21/12; B01J 21/16; B01J 29/04; B01J 37/0018; B01J 37/04; C10G 11/05; C10G 11/18; C10G 2300/70
See application file for complete search history.

(56) References Cited

U.S. PATENT DOCUMENTS

| | | |
|---|---|---|
| 4,086,187 A | 4/1978 | Lim et al. |
| 2003/0003035 A1 | 2/2003 | Stamires et al. |
| 2003/0166453 A1 | 4/2003 | Kuvettu et al. |
| 2005/0272593 A1* | 12/2005 | Wachter ............ B01J 37/0232 502/60 |
| 2014/0116923 A1 | 1/2014 | Dinda et al. |

FOREIGN PATENT DOCUMENTS

| | | |
|---|---|---|
| EP | 1863588 | 11/2017 |
| WO | 2002/098563 | 12/2002 |
| WO | 2006/067154 | 6/2006 |
| WO | 2007/006047 | 1/2007 |
| WO | 2018/027173 | 1/2007 |

* cited by examiner

*Primary Examiner* — Brian A McCaig
(74) *Attorney, Agent, or Firm* — Nathaniel C. Dunn; Troy S. Kleckley

(57) ABSTRACT

Process for the preparation of a catalyst and a catalyst comprising more than one silica is provided herein. Thus, in one embodiment, the invention provides a particulate FCC catalyst comprising about 5 to about 60 wt % one or more zeolites, about 10 to about 45 wt % quasicrystalline boehmite (QCB), about 0 to about 35 wt % microcrystalline boehmite (MCB), greater than about 0 to about 15 wt % silica from sodium stabilized colloidal silica, greater than about 0 to about 30 wt % silica from ammonia stabilized or lower sodium colloidal silica, and the balance clay and the process for making the same. This process results in attrition resistant catalysts with good performance.

7 Claims, No Drawings

FCC CATALYST PREPARED BY A PROCESS INVOLVING MORE THAN ONE SILICA MATERIAL

FIELD OF THE INVENTION

The present invention pertains to a catalyst composition and its use in a process for the cracking or conversion of a feed comprised of hydrocarbons, such as, for example, those obtained from the processing of crude petroleum, with better physical properties and performance.

BACKGROUND

A common challenge in the design and production of heterogeneous catalysts is to find a good compromise between the effectiveness and/or accessibility of the active sites and the effectiveness of the immobilising matrix in giving the catalyst particles sufficient physical strength, i.e. attrition resistance.

The preparation of attrition resistant catalysts is disclosed in several prior art documents. U.S. Pat. No. 4,086,187 discloses a process for the preparation of an attrition resistant catalyst by spray-drying an aqueous slurry prepared by mixing (i) a faujasite zeolite with a sodium content of less than 5 wt % with (ii) kaolin, (iii) peptised pseudoboehmite, and (iv) ammonium polysilicate. The attrition resistant catalysts according to U.S. Pat. No. 4,206,085 are prepared by spray-drying a slurry prepared by mixing two types of acidified pseudoboehmite, zeolite, alumina, clay, and either ammonium polysilicate or silica sol.

WO 02/098563 discloses a process for the preparation of an FCC catalyst having both a high attrition resistance and a high accessibility. The catalyst is prepared by slurrying zeolite, clay, and boehmite, feeding the slurry to a shaping apparatus, and shaping the mixture to form particles, characterised in that just before the shaping step the mixture is destabilised. This destabilisation is achieved by, e.g., temperature increase, pH increase, pH decrease, or addition of gel-inducing agents such as salts, phosphates, sulphates, and (partially) gelled silica. Before destabilisation, any peptisable compounds present in the slurry must have been well peptised.

WO 06/067154 describes an FCC catalyst, its preparation and its use. It discloses a process for the preparation of an FCC catalyst having both a high attrition resistance and a high accessibility. The catalyst is prepared by slurrying a clay, zeolite, a sodium-free silica source, quasi-crystalline boehmite, and micro-crystalline boehmite, provided that the slurry does not comprise peptised quasi-crystalline boehmite, b) adding a monovalent acid to the slurry, c) adjusting the pH of the slurry to a value above 3, and d) shaping the slurry to form particles.

BRIEF DESCRIPTION OF THE INVENTION

The present invention relates to an FCC catalyst meant to be employed in the process for cracking, a hydrocarbon feed over a particular catalyst composition to produce conversion product hydrocarbon compounds of lower molecular weight than feed hydrocarbons, e.g., product comprising a high gasoline fraction. A unique feature of the invention is the use of more than one silica source.

Thus, in one embodiment, provided is a particulate FCC catalyst comprising about 5 to about 60 wt % one or more zeolites, about 10 to about 45 wt % quasicrystalline boehmite (QCB), about 0 to about 35 wt % microcrystalline boehmite (MCB), greater than about 0 to about 15 wt % silica from sodium stabilized colloidal silica, greater than about 0 to about 30 wt % silica from ammonia stabilized or lower sodium colloidal silica, and the balance clay.

In another embodiment, provided is a process for manufacturing an FCC catalyst, wherein the process comprises:
(a) Adding, clay, boehmite, sodium stabilized colloidal silica to form a slurry;
(b) Digesting the slurry with a monoprotic acid to a pH of less than 4;
(c) Adding one or more zeolites to the slurry;
(d) Adding the ammonia stabilized or lower sodium colloidal silica at any time during or after steps (a)-(c) but before step (e);
(e) Mixing the slurry and then destabilizing the slurry by raising the pH to above 4.0;
(f) Shaping and collecting the resulting FCC Catalyst.

The resulting catalyst shows improved benefits over that known in the art. It is evident from the physical properties (ABD and attrition) that the catalysts of the present invention showed similar attributes as to the catalysts known in the art. However, each of the catalysts showed performance advantages, particularly on bottoms or coke.

In a still further embodiment, provided is a process for cracking a petroleum fraction feedstock said process comprising the steps of:
a) providing an FCC catalyst composition comprising about 5 to about 60 wt % one or more zeolites, about 10 to about 45 wt % quasicrystalline boehmite, about 0 to about 35 wt % microcrystalline boehmite, greater than about 0 to about 15 wt % silica from sodium stabilized colloidal silica, greater than about 0 to about 30 wt % silica from ammonia stabilized or lower sodium colloidal silica, and the balance clay;
b) contacting the FCC catalyst with said petroleum fraction feedstock at a temperature in the range of from 400 to 650° C., with a dwell time in the range of from 0.5 to 12 seconds.

These and still other embodiments, advantages and features of the present invention shall become further apparent from the following detailed description, including the appended claims.

DETAILED DESCRIPTION OF THE INVENTION

Unless otherwise indicated, weight percent (_____ wt %) as used herein is the dry base weight percent of the specified form of the substance, based upon the total dry base weight of the product for which the specified substance or form of substance is a constituent or component. It should further be understood that, when describing steps or components or elements as being preferred in some manner herein, they are preferred as of the initial date of this disclosure, and that such preference(s) could of course vary depending upon a given circumstance or future development in the art.

General Procedure

The first step of the process of manufacturing the improved catalyst is to mix clay sources, with sodium stabilized colloidal silica, and one or more alumina (boehmite) sources. As will be discussed below, one can optionally add a second silica source of ammonia stabilized or lower sodium colloidal silica to this slurry or at a later step. The clay, zeolite, QCB, MCB, sodium stabilized colloidal silica, and optional other components can be slurried by adding them to water as dry solids. Alternatively, slurries containing the individual materials are mixed to form the slurry. It is also possible to add some of the materials as slurries, and others as dry solids. Optionally, other components may be added, such as aluminium chlorohydrol, aluminium nitrate, $Al_2O_3$, $Al(OH)_3$, anionic clays (e.g. hydrotalcite), smectites, sepiolite, barium titanate, calcium titanate, calcium-silicates, magnesium-silicates, magnesium titanate, mixed metal oxides, layered hydroxy salts, additional zeolites, magnesium oxide, bases or salts, and/or metal additives such as compounds containing an alkaline earth metal (for instance Mg, Ca, and Ba), a Group IIIA transition metal, a Group IVA transition metal (e.g. Ti, Zr), a Group VA transition metal (e.g. V, Nb), a Group VIA transition metal (e.g. Cr, Mo, W), a Group VIIA transition metal (e.g. Mn), a Group VIIIA transition metal (e.g. Fe, Co, Ni, Ru, Rh, Pd, Pt), a Group IB transition metal (e.g. Cu), a Group IIB transition metal (e.g. Zn), a lanthanide (e.g. La, Ce), or mixtures thereof. Any order of addition of these compounds may be used. It is also possible to combine these compounds all at the same time.

The term "boehmite" is used in the industry to describe alumina hydrates which exhibit X-ray diffraction (XRD) patterns close to that of aluminium oxide-hydroxide [AlO(OH)]. Further, the term boehmite is generally used to describe a wide range of alumina hydrates which contain different amounts of water of hydration, have different surface areas, pore volumes, specific densities, and exhibit different thermal characteristics upon thermal treatment. Yet their XRD patterns, although they exhibit the characteristic boehmite [AlO(OH)] peaks, usually vary in their widths and can also shift in their location. The sharpness of the XRD peaks and their location has been used to indicate the degree of crystallinity, crystal size, and amount of imperfections.

Broadly, there are two categories of boehmite aluminas: quasi-crystalline boehmites (QCBs) and micro-crystalline boehmites (MCBs). In the state of the art, quasi-crystalline boehmites are also referred to as pseudo-boehmites and gelatinous boehmites. Usually, these QCBs have higher surface areas, larger pores and pore volumes, and lower specific densities than MCBs. They disperse easily in water or acids, have smaller crystal sizes than MCBs, and contain a larger number of water molecules of hydration. The extent of hydration of QCB can have a wide range of values, for example from about 1.4 up to about 2 moles of water per mole of Al, intercalated usually orderly or otherwise between the octahedral layers. Some typical commercially available QCBs are Pural®, Catapal®, and Versal® products.

Microcrystalline boehmites are distinguished from the QCBs by their high degree of crystallinity, relatively large crystal size, very low surface areas, and high densities. Contrary to QCBs, MCBs show XRD patterns with higher peak intensities and very narrow half-widths. This is due to their relatively small number of intercalated water molecules, large crystal sizes, the higher degree of crystallization of the bulk material, and the smaller amount of crystal imperfections. Typically, the number of water molecules intercalated can vary in the range from about 1 up to about 1.4 per mole of Al.

The slurry preferably comprises about 1 to about 50 wt %, more preferably about 10 to about 35 wt %, of non-peptised QCB based on the final catalyst. The slurry also comprises about 0 to about 50 wt %, more preferably about 0 to about 35 wt % of MCB based on the final catalyst.

The clay is preferred to have a low sodium content, or to be sodium-free. Suitable clays include kaolin, bentonite, saponite, sepiolite, attapulgite, laponite, hectorite, English clay, anionic clays such as hydrotalcite, and heat- or chemically treated clays such as meta-kaolin. The slurry preferably comprises about 5 to about 70 wt %, more preferably about 10 to about 60 wt %, and most preferably about 10 to about 50 wt % of clay based on the final catalyst.

In a next step, a monovalent acid is added to the suspension, causing digestion. Both organic and inorganic monovalent acids can be used, or a mixture thereof. Examples of suitable monovalent acids are formic acid, acetic acid, propionic acid, nitric acid, and hydrochloric acid. The acid is added to the slurry in an amount sufficient to obtain a pH lower than 7, more preferably between 1 and 4.

In the next step, one or more zeolites are added. The zeolites used in the process according to the present invention preferably have a low sodium content (less than 1.5 wt % $Na_2O$), or are sodium-free. Suitable zeolites to be used include zeolites such as Y-zeolites—including HY, USY, dealuminated Y, RE-Y, and RE-USY—zeolite beta, ZSM-5, phosphorus-activated ZSM-5, ion-exchanged ZSM-5, MCM-22, and MCM-36, metal-exchanged zeolites, ITQs, SAPOs, ALPOs, and mixtures thereof. The slurry preferably comprises 5 to 60 wt % of one or more zeolite based on the final catalyst.

As will be discussed below, a second silica source may be added to the slurry at any point prior if the second silica source is ammonia stabilized or lower sodium colloidal silica.

The above slurry is then passed through a high sheer mixer where it is destabilized by increasing the pH. The pH of the slurry is subsequently adjusted to a value above 3, more preferably above 3.5, even more preferably above 4. The pH of the slurry is preferably not higher than 7, because slurries with a higher pH can be difficult to handle. The pH can be adjusted by adding a base (e.g. NaOH or $NH_4OH$) to the slurry. The time period between the pH adjustment and shaping step d) preferably is 30 minutes or less, more preferably less than 5 minutes, and most preferably less than 3 minutes. At this step, the solids content of the slurry preferably is about 10 to about 45 wt %, more preferably about 15 to about 40 wt %, and most preferably about 25 to about 35 wt %.

The slurry is then shaped. Suitable shaping methods include spray-drying, pulse drying, pelletising, extrusion (optionally combined with kneading), beading, or any other conventional shaping method used in the catalyst and absorbent fields or combinations thereof. A preferred shaping method is spray-drying. If the catalyst is shaped by spray-drying, the inlet temperature of the spray-dryer preferably ranges from 300 to 600° C. and the outlet temperature preferably ranges from 105 to 200° C.

Silica Sources

A unique feature of the present invention is the use of at least two sources of silica within the catalyst particle. The total amount of silica added is greater than 1.0%. It is preferred that the total silica is greater than about 5.0% and it is most preferred that the total amount of silica is greater than about 10.0%. Further, it is preferred that the ratio of the first silica source to the second silica source is from about 1:1 to about 1:10.

The first source of silica is typically a low sodium silica source and is added to the initial slurry. Examples of such silica sources include, but are not limited to potassium silicate, sodium silicate, lithium silicate, calcium silicate, magnesium silicate, barium silicate, strontium silicate, zinc silicate, phosphorus silicate, and barium silicate. Examples of suitable organic silicates are silicones (polyorganosiloxanes such as polymethylphenylsiloxane and polydimethylsiloxane) and other compounds containing Si—O—C—O—Si structures, and precursors thereof such as methyl chlorosilane, dimethyl chlorosilane, trimethyl chlorosilane, and mixtures thereof. Preferred low sodium silica sources are sodium stabilized colloidal silicas. The slurry further comprises greater than 0 to about 15 wt % and more preferably greater than about 0.5 to about 10 wt % of silica from the low sodium silicon source based on the weight of the final catalyst and most preferred greater than about 1 wt % to 8 wt %.

The second silica source is typically an ammonia stabilized colloidal silica or a lower sodium-stabilized silica that has sodium content lower than that in the first silica source. Generally, ammonia stabilized or lower sodium colloidal silica has pH about 7-11 with the presence of ammonia as charge stabilizer. More commonly, pH of ammonia stabilized colloidal is about 8-10.5. Ammonia stabilized silica may also have very low sodium or is essentially sodium free. Suitable silicon sources to be added as a second silica source include (poly)silicic acid, ammonium silicate, sodium-free silicon sources, and organic silicon or mixtures thereof. This second addition of silica is added in an amount of greater than about 0 to 30 wt %, preferably greater than about 1 wt % to about 25 wt % and most preferably about 5 to about 20% based on the weight of the final catalyst.

The Resulting Catalyst

The catalyst is generally an FCC catalyst comprising about 5 to about 60% one or more zeolites, about 10 to about 45 wt % quasicrystalline boehmite, about 0 to about 25 wt % microcrystalline boehmite, greater than about 0 wt % to about 15 wt % silica from sodium stabilized colloidal silica, greater than about 0 wt % to about 30 wt % silica from ammonia stabilized or lower sodium colloidal silica, and the balance clay.

These catalysts can be used as FCC catalysts or FCC additives in hydroprocessing catalysts, alkylation catalysts, reforming catalysts, gas-to-liquid conversion catalysts, coal conversion catalysts, hydrogen manufacturing catalysts, and automotive catalysts. The process of the invention is particularly applicable to Fluid Catalytic Cracking (FCC). In the FCC process, the details of which are generally known, the catalyst, which is generally present as a fine particulate comprising over 90 wt % of the particles having diameters in the range of about 5 to about 300 microns. In the reactor portion, a hydrocarbon feedstock is gasified and directed upward through a reaction zone, such that the particulate catalyst is entrained and fluidized in the hydrocarbon feedstock stream. The hot catalyst, which is coming from the regenerator, reacts with the hydrocarbon feed which is vaporized and cracked by the catalyst. Typically temperatures in the reactor are 400-650 C and the pressure can be under reduced, atmospheric or superatmospheric pressure, usually about atmospheric to about 5 atmospheres. The catalytic process can be fixed bed, moving bed, or fluidized bed, and the hydrocarbon flow may be either concurrent or countercurrent to the catalyst flow. The process of the invention is also suitable for TCC (Thermofor catalytic cracking) or DCC.

EXAMPLES

Prior to any lab testing the catalyst must be deactivated to simulate catalyst in a refinery unit, this is typically done with steam. These samples were deactivated either by cyclic deactivation with Ni/V which consists of cracking, stripping and regeneration steps in the presence of steam or with 100% steam at higher temperatures, which are industrially accepted deactivation methods for FCC catalysts. The deactivation step is known in the art, and is necessary to catalytic activity. In commercial FCC setting, deactivation occurs shortly after catalyst introduction, and does not need to be carried out as a separate step.

Example 1

Four separate examples were made using the techniques described herein. Each separate example was compared to a base case of using a single silica source. The amount of each silica varied for each of the examples, as detailed below in the tables. It is evident from the physical properties (ABD and attrition) data shown below that all the catalysts of the present invention showed similar attributes as to the base catalysts. However, each of the catalysts showed performance advantages, particularly on bottoms or coke.

The examples were subjected to a Fluid Microactivity test, or Fluidized-bed Simulation Test (FST) or Advanced Cracking Evaluation (ACE). ACE is a test known and generally accepted in the art for ascertaining the FCC cracking activity of a catalyst. In ACE, the test is conducted with a series of four catalyst-to-feed ratios (CTO) which are obtained by varying the mass of feed injected to the reactor, while using the same amount of catalyst for all runs. The testing apparatus simulates the cracking of a known amount of a hydrocarbon feedstock of known amount and compositional characteristics. This small scale testing unit is a once through unit and operated approximately as in ASTM 5154-10.

The attrition resistance of the catalysts was measured using a method substantially based on ASTM 5757 Standard Test Method for Determination of Attrition and Abrasion of Powdered Catalysts by Air Jets, the results from which indicate that the more attrition resistant the catalyst is, the lower the resulting attrition index value observed when testing a material using the above-referenced method.

Example 1-A

|  | Comparative 1 | Catalyst 1 |
|---|---|---|
| Catalyst Description |  |  |
| Low sodium colloidal silica | 20.0 | 5.0 |
| NH4-colloidal silica | 0.0 | 15.0 |
| Properties |  |  |
| ABD | 0.69 | 0.74 |
| Attrition | 1.52 | 0.83 |
| Testing |  |  |
| 430° F. + Conversion, wt % | 75.05 | 74.93 |
| Catalyst-to-Oil, wt/wt | 5.00 | 5.00 |
| Coke | 4.18 | 4.06 |
| % coke reduction |  | 3% |
| 650° F. + | 9.22 | 8.90 |
| % bottoms upgrading |  | 4% |

Example 1-B

|  | Comparative 2 | Catalyst 2 |
|---|---|---|
| Catalyst Description |  |  |
| Low sodium colloidal silica | 20.0 | 5.0 |
| NH4-colloidal silica | 0.0 | 15.0 |
| Properties |  |  |
| ABD | 0.71 | 0.7 |
| Attrition | 1.14 | 1.04 |
| Testing |  |  |
| 430° F. + Conversion, wt % | 74.66 | 75.04 |
| Catalyst-to-Oil, wt/wt | 5.00 | 5.00 |
| Coke | 4.18 | 4.10 |
| % coke reduction |  | 2% |
| 650° F. + | 9.35 | 9.18 |
| % bottoms upgrading |  | 2% |

Example 1-C

|  | Comparative 3 | Catalyst 3 | Catalyst 4 |
|---|---|---|---|
| Catalyst Description |  |  |  |
| Low sodium colloidal silica | 13.0 | 5.0 | 5.0 |
| NH4-colloidal silica | 0.0 | 8.0 | 8.0 |
| Properties |  |  |  |
| ABD | 0.68 | 0.67 | 0.67 |
| Attrition | 1.27 | 1.36 | 1.30 |
| Testing |  |  |  |
| 430° F. + Conversion, wt % | 74.52 | 76.20 | 75.75 |
| Catalyst-to-Oil, wt/wt | 5.00 | 5.00 | 5.00 |
| Coke | 4.27 | 3.77 | 3.95 |
| % coke reduction |  | 12% | 8% |
| 650° F. + | 9.30 | 9.22 | 9.31 |
| % bottoms upgrading |  | 1% | 0% |

The invention claimed is:

1. A process for manufacturing an FCC catalysts comprising:
    a. Adding; clay, boehmite, and a first sodium stabilized colloidal silica to form a slurry;
    b. Digesting the slurry with a monoprotic acid to a pH of less than 4;
    c. Adding one or more zeolites to the slurry;
    d. Adding a second silica that is either an ammonia stabilized or sodium stabilized colloidal silica, wherein the sodium content is less than the first sodium stabilized colloidal silica, at any time during or after steps (a) (c) but before step (e);
    e. Mixing the slurry and then destabilizing the slurry by raising the pH to above 4.0;
    f. Shaping and collecting the resulting FCC Catalyst.

2. The process of claim 1 further comprising adding about 5 to about 60 wt % one or more zeolites.

3. The process of claim 1 further comprising adding greater than 0 to about 15 wt % of the first sodium stabilized colloidal silica.

4. The process of claim 1 further comprising adding greater than 0.5 wt % to about 10 wt % of the first sodium stabilized colloidal silica.

5. The process of claim 1 further comprising adding greater than 0 to about 30 wt % of the second silica.

6. The process of claim 1 further comprising adding greater than 1 wt % to about 25 wt % of the second silica.

7. The process of claim 1 further comprising adding greater than 5 wt % to about 20 wt % of the second silica.

* * * * *